United States Patent
Mohanty et al.

(10) Patent No.: US 7,582,241 B2
(45) Date of Patent: Sep. 1, 2009

(54) FILLER REINFORCED THERMOPLASTIC COMPOSITIONS AND PROCESS FOR MANUFACTURE

(75) Inventors: Amar K. Mohanty, Okemos, MI (US); Preveen Tummala, East Lansing, MI (US); Manjusri Misra, Okemos, MI (US); Lawrence T. Drzal, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 271 days.

(21) Appl. No.: 10/701,879

(22) Filed: Nov. 5, 2003

(65) Prior Publication Data

US 2004/0122133 A1 Jun. 24, 2004

Related U.S. Application Data

(60) Provisional application No. 60/424,561, filed on Nov. 7, 2002.

(51) Int. Cl.
*B28B 3/20* (2006.01)
*C08K 3/10* (2006.01)
(52) U.S. Cl. ............... 264/211; 264/211.12; 524/606
(58) Field of Classification Search ............ 264/176.1, 264/211, 211.12, 328.1, 349; 524/399, 432, 524/433, 434, 436, 514, 601, 605, 606
See application file for complete search history.

(56) References Cited

U.S. PATENT DOCUMENTS

| | | | | |
|---|---|---|---|---|
| 3,346,352 A | * | 10/1967 | McCoy et al. | 44/543 |
| 3,637,571 A | * | 1/1972 | Polovina | 523/333 |
| 3,947,255 A | * | 3/1976 | Hartman et al. | 44/553 |
| 4,092,301 A | | 5/1978 | Russo et al. | |
| 4,481,354 A | | 11/1984 | Curatolo et al. | |
| 4,588,797 A | | 5/1986 | Curatolo et al. | |
| 4,619,962 A | | 10/1986 | Sato | |
| 4,885,340 A | * | 12/1989 | Hamada et al. | 525/183 |
| 6,100,320 A | * | 8/2000 | Cobb et al. | 524/399 |
| 6,207,729 B1 | * | 3/2001 | Medoff et al. | 523/129 |
| 6,270,883 B1 | | 8/2001 | Sears et al. | |
| 2002/0000683 A1 | | 1/2002 | Sears et al. | |

OTHER PUBLICATIONS

Valenti, B., E. Bianchi, G. Greppi, A. Tealdi, A. Ciferri, Bulk Properties of Synthetic Polymer-Inorganic Salt Systems. Melting Behavior of Salted Poly(caproamide), The Journal of Physical Chemistry, vol. 77, No. 3 (1973), pp. 389-395.*

* cited by examiner

*Primary Examiner*—Matthew J. Daniels
(74) *Attorney, Agent, or Firm*—Ian C. McLeod

(57) ABSTRACT

A thermoplastic polymer composition reinforced with fibers such as cellulose or other fillers, particularly from natural sources, and a process for manufacturing the composition are disclosed. The polymer is extruded with a salt which reduces the melting point and pelletized. The pellets are then extruded again with the filler. The composition with the filler can then be melted at the reduced melting temperature to manufacture an article.

21 Claims, 9 Drawing Sheets

FILLER REINFORCED THERMOPLASTIC COMPOSITIONS AND PROCESS FOR MANUFACTURE

CROSS-REFERENCE TO RELATED APPLICATION

This application claims priority to Provisional Application Ser. No. 60/424,561, filed Nov. 7, 2002.

STATEMENT REGARDING FEDERALLY SPONSORED RESEARCH OR DEVELOPMENT

Not applicable.

REFERENCE TO A "COMPUTER LISTING APPENDIX SUBMITTED ON A COMPACT DISC"

Not Applicable.

BACKGROUND OF THE INVENTION (1) Field of the Invention

The present invention relates to a thermoplastic polymer composition reinforced with natural fibers such as cellulose or other fillers and to a process for manufacturing the composition. The process for making a naturally derived fiber-reinforced thermoplastic polymer composition comprises melting a high melting temperature thermoplastic polymer, mixing the melted thermoplastic polymer with an organic or inorganic salt to reduce the melting temperature of the melted thermoplastic polymer to a melting temperature which does not degrade the natural fibers, and then adding the naturally derived fibers to produce the naturally derived fiber-reinforced thermoplastic polymer composition. The naturally derived fiber-reinforced thermoplastic polymer composition can then be melted at the reduced melting temperature to manufacture a plurality of articles.

(2) Description of Related Art

Because of their ability to be readily molded into three-dimensional objects, plastics are the most commonly chosen engineering materials in any industry. These plastics can be easily tailored to have a wide range of physico-mechanical properties. With the addition of high strength and modulus reinforcements and filler materials like fibers, plastics can be designed for structural applications. Glass fibers are the workhorse for polymer/fiber composite materials. Glass fiber reinforced plastic composites provide the desired stiffness and toughness required for structural applications. Although there are many advantages of the glass fiber composites, there are certain disadvantages also which include wear and abrasion of processing equipment, high cost and low recycle potential.

With increasing environmental concerns, natural fibers have been found to be a potential reinforcement and filler for both thermoset and thermoplastic composites. Natural fibers are plant based agricultural products and are obtained either from the leaf, seed or stalk of a plant. These natural fiber reinforced bio-composites can find a wide variety of applications mainly in the automotive and building construction industries. Long natural fibers, like flax, kenaf, and hemp are finding increasing use, mainly as reinforcement materials in automotive composites. Economics, weight reduction, strength, durability, compatibility, easy recyclability and environmental friendliness are the driving forces for the use of natural fibers in composites replacing glass fibers.

The residue produced when glass-fiber reinforced plastic composites are burned is made up of large numbers of very small glass filaments which cannot be broken down using ecologically compatible methods. Furthermore, the glass dust generated can cause health risks. Plastics reinforced with natural fibers, on the other hand, are harmless from both an ecological and occupational health viewpoint. When the natural fibers are burned they release only the amount of carbon dioxide which the plant absorbed when it was growing and therefore the use of plant material is $CO_2$ neutral, that is there is no increase in greenhouse gases. In light of all the above, research has been undertaken to reinforce the engineering thermoplastics with the natural fibers replacing the existing glass fibers.

Extrusion and injection molding are the two very important processing techniques employed in any engineering industry involved with plastics and composites. Researchers have successfully used natural fibers as reinforcing materials replacing the glass fibers. But they have been forced to adhere to low temperature melting thermoplastic-natural fiber composites as the natural fibers start to degrade thermally at or above 200° C. Thermal degradation of natural fibers results in poor physico-mechanical properties and discoloration of the fibers. Reinforcing high temperature melting thermoplastics which melt above 200° C. with natural fibers has turned out to be a challenging task. Hence, a processing technique where one can depress the melting temperature of the high temperature melting thermoplastic to below 200° C. would be an ideal solution for this problem.

Very few attempts have been made to develop a process for producing thermoplastic polymer compositions reinforced with natural fibers from high temperature melting thermoplastic polymers because the natural fibers degrade at or below the melting temperatures of these plastics. The only process known for producing high temperature melting thermoplastic polymer compositions reinforced with natural fibers the inventors are aware of is disclosed in U.S. Pat. No. 6,270,883 and U.S. Application Publication No. 2002/0000683 A1, both to Sears et al. The high temperature melting thermoplastic polymer compositions were prepared by compounding a high temperature melting thermoplastic polymer and a natural fiber in an extruder in which all the zones of the extruder had been heated to an initial temperature above the melting temperature of the plastic. After running the polymer and the fiber for a while through the extruder, the temperature of the extruder from the mid-zone to the end-zone was lowered to a temperature well below 200° C. This enabled the polymer, which had been melted in the initial high temperature zones, to still flow through the low temperature mid- and end-zones thus, making it possible to now add natural fibers to the melted polymer without danger of exposing the fibers to the high temperatures needed to melt the polymer. Thereafter, once the process had reached an equilibrium temperature from the mid-zone to the end-zone, the composition was collected from the end of the extruder. The extruded composition was then injection molded at a temperature above the melting temperature of the polymer. Therefore, even though the fibers had been incorporated into the polymer at a temperature low enough to preserve the integrity of the fibers, injection molding the composition at the melting temperature of the polymer causes the natural fibers to degrade. Thus, the original strength of reinforcing natural fiber in the composition is lost.

There is an extensive body of literature on the interaction of the various metal halides with polyamides like nylon. For example, it was discovered that the addition of metal halides depressed the melting temperature of nylon. Lithium chloride, lithium bromide, and copper chloride were found to be effective in reducing the melting temperature of polyamides. It was also discovered that compounding polyamides with inorganic salts such as metal halides imparted desirable qualities to the compounded product such as elimination of voids and improving the elastic modulus which had already been established in laboratory scale experiments wherein the blending of polyamides and metal halides was done by dissolving them in a solvent and then extracting the solvent.

Several U.S. patents disclose processes for lowering the melting temperature of polyamides. U.S. Pat. No. 4,092,301 to Russo et al. discloses a process for making low melting point polyamides in which a lactam is polymerized in a mixture comprising an alkaline anionic catalyst, an anionic activator, and either LiCl or LiBr to make a polymer. U.S. Pat. No. 4,619,962 to Sato discloses a low melting point thermoplastic composition comprising a polyamide, a halide such as LiCl, a synthetic rubbery polymer, and an oxide or hydroxide of magnesium, calcium, barium, or zinc, or a peroxide of calcium or zinc and a process for producing the same. U.S. Pat. Nos. 4,481,354 and 4,588,797, both to Curatolo et al. disclose a process and composition for making low melting point nylon compositions comprising contacting a nylon composition or mixture thereof with a lithium halide and an organic sulfone. However, none of the above U.S. patents suggest that the low melting point polyamides can be used for making thermoplastic compositions reinforced with natural fibers.

Despite the knowledge that particular metal halides reduce the melting temperature of polyamides, the inventors are not aware that the knowledge has ever been correlated with a process for producing thermoplastic polymer compositions reinforced with natural fibers wherein using a polyamide in which the melting point has been reduced enables the integrity of the natural fibers to be preserved. Thus, until the present invention, it was not possible to make high temperature melting thermoplastic polymer compositions reinforced with natural fibers.

SUMMARY OF THE INVENTION

The present invention provides a thermoplastic polymer composition reinforced with fibers from a natural source such as cellulose or other fillers and to a process for manufacturing the composition. The preferred process for making the fiber-reinforced thermoplastic polymer composition comprises melting a high melting temperature thermoplastic polymer, mixing the melted thermoplastic polymer with an inorganic salt to reduce the melting temperature of the melted thermoplastic polymer to a melting temperature which does not degrade the fibers, and then adding the fibers to produce the natural fiber-reinforced thermoplastic polymer composition. The natural fiber-reinforced thermoplastic polymer composition can be melted at the reduced melting temperature to manufacture a plurality of articles.

Therefore, the present invention provides a process for producing a filler-reinforced thermoplastic polymer composition which comprises (a) melt-forming a mixture of a high melting temperature thermoplastic polymer with a first melting temperature with a metal salt, wherein the salt is present in an amount which reduces the melting temperature of the mixture to a second lower melting temperature; and (b) introducing a filler, which degrades at the first melting temperature, into the mixture at the second melting temperature or less without degrading the filler to form the filler-reinforced thermoplastic polymer composition.

In a further embodiment of the process, the filler is a cellulose or a cellulosic fiber.

In a further embodiment of the process, the thermoplastic polymer is selected from the group consisting of nylon, polyethylene terephthalate (PET), polybutylene terephthalate (PBT), polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

In a further embodiment of the process, the metal in the metal salt forms a reaction product with the polymer in the melt.

In a further embodiment of the process, the metal salt is a metal halide.

In a further embodiment of the process, thermoplastic polymer composition is molded into a shape.

In a further embodiment of the process, thermoplastic polymer composition is formed by extrusion first in step (a) and then in step (b).

In a further embodiment of the process, the filler further includes a glass or high melting temperature polymer fiber.

The present invention further provides a process for producing a fiber-reinforced thermoplastic polymer composition which comprises (a) melt-forming a mixture of a high melting temperature thermoplastic polymer with a first melting temperature with at least one metal salt selected form the group consisting of lithium chloride, lithium bromide, lithium iodide, copper chloride, zinc chloride, aluminum chloride, gallium chloride, and mixtures thereof wherein the salt reduces the melting point of the mixture to a second lower melting temperature; and (b) introducing one or more fibers, which degrade at the first melting point, into the mixture at the second melting point or less without degrading the fibers to form the fiber-reinforced thermoplastic polymer composition.

In a further embodiment of the process, the fibers are selected from the group consisting of hemp, flax, kenaf, jute, sisal, pineapple leaf fiber, coir, henequen, pure cellulose in its various forms, corn, cotton, and mixtures thereof.

In a further embodiment of the process, the fiber-reinforced composition further includes a maleated compatibilizer and one or more toughening agents selected from the group consisting of rubber, modified rubber, maleated rubber, epoxidized rubber, vegetable oil-based plasticizer, and mixtures thereof.

In a further embodiment of the process, the thermoplastic polymer is selected from the group consisting of nylon, polyethylene terephthalate (PET), polybutylene terephthalate (PBT), polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

In a further embodiment of the process, the metal in the metal salt forms a reaction product with the thermoplastic polymer in the melt.

In a further embodiment of the process, the fiber-reinforced thermoplastic polymer composition is molded into a shape.

In a further embodiment of the process, the fiber-reinforced thermoplastic polymer composition is formed by extrusion first in step (a) and then in step (b).

In a further embodiment of the process, a glass or high melting temperature polymer fiber is introduced with the fibers in step (b).

The present invention further provides a process for producing a filler-reinforced thermoplastic polymer composition which comprises (a) melt-forming a mixture of a thermoplastic polymer with a melting temperature at about 200° C. or above with at least one metal salt, wherein the salt is present in an amount which reduces the melting temperature of the mixture to less than about 200° C.; and (b) introducing the filler, which degrades at 200° C. or above, into the mixture at less than 200° C. without degrading the filler to form the natural fiber-reinforced thermoplastic polymer composition.

In a further embodiment of the process, the thermoplastic polymer is selected from the group consisting of nylon, polyethylene terephthalate (PET), polybutylene terephthalate (PBT), polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

In a still further embodiment of the process, the filler is selected from the group consisting of hemp, flax, kenaf, jute, sisal, pineapple leaf fiber, coir, henequen, pure cellulose in its various forms, corn, cotton, and mixtures thereof.

In a still further embodiment of the process, the metal salt is selected form the group consisting of lithium chloride, lithium bromide, lithium iodide, copper chloride, zinc chloride, aluminum chloride, gallium chloride, and mixtures thereof.

In a still further embodiment of the process, the filler further includes a glass or high melting temperature polymer fiber.

The present invention further provides a polymer composition produced by any one of the above processes. Thus, the present invention provides a process which comprises (a) a modified thermoplastic polymer which has been melt-processed with a metal salt to produce a reduced melting temperature which is less than the melting temperature of a pristine thermoplastic polymer precursor; and (b) a filler which has been melt-processed at the reduced melting temperature into the modified thermoplastic polymer without degrading, wherein the filler degrades at the melting temperature of the pristine thermoplastic polymer precursor.

In a further embodiment of the composition, the metal salt is selected from the group consisting of lithium chloride, lithium bromide, lithium iodide, copper chloride, zinc chloride, aluminum chloride, gallium chloride, and mixtures thereof.

In a further embodiment of the composition, the filler is a cellulosic material, preferably a cellulosic material selected from the group consisting of hemp, flax, kenaf, jute, sisal, pineapple leaf fiber, coir, henequen, pure cellulose in its various forms, corn, cotton, and mixtures thereof.

In a further embodiment of the composition, the thermoplastic polymer is selected from the group consisting of nylon, polyethylene terephthalate (PET), polybutylene terephthalate (PBT) polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

In a further embodiment of the composition, the composition further includes a maleated compatibilizer and one or more toughening agents selected from the group consisting of rubber, modified rubber, maleated rubber, epoxidized rubber, vegetable oil-based plasticizer, and mixtures thereof.

In a further embodiment of the composition, the composition further includes a glass or high melting temperature polymer fiber.

OBJECTS

It is an object of the present invention to provide a process for making thermoplastic polymer compositions reinforced with fibers or other fillers using high melting point thermoplastic polymers wherein the fibers are not degraded during production of the polymer or in downstream processes which use the composition such as injection molding.

It is also an object of the present invention to provide thermoplastic polymer compositions reinforced with fibers or other fillers wherein the compositions are produced from high melting point thermoplastic polymers and the natural fibers are not degraded during production of the polymer or in downstream processes which use the composition such as injection molding.

These and other objects of the present invention will become increasingly apparent with reference to the following drawings and preferred embodiments.

DESCRIPTION OF THE DRAWINGS

FIG. 6A is a laser scanning microscopy phase image of nylon 6 with 3.5 wt % LiCl taken using polarized light (160×).

DETAILED DESCRIPTION OF THE INVENTION

Figure 1:
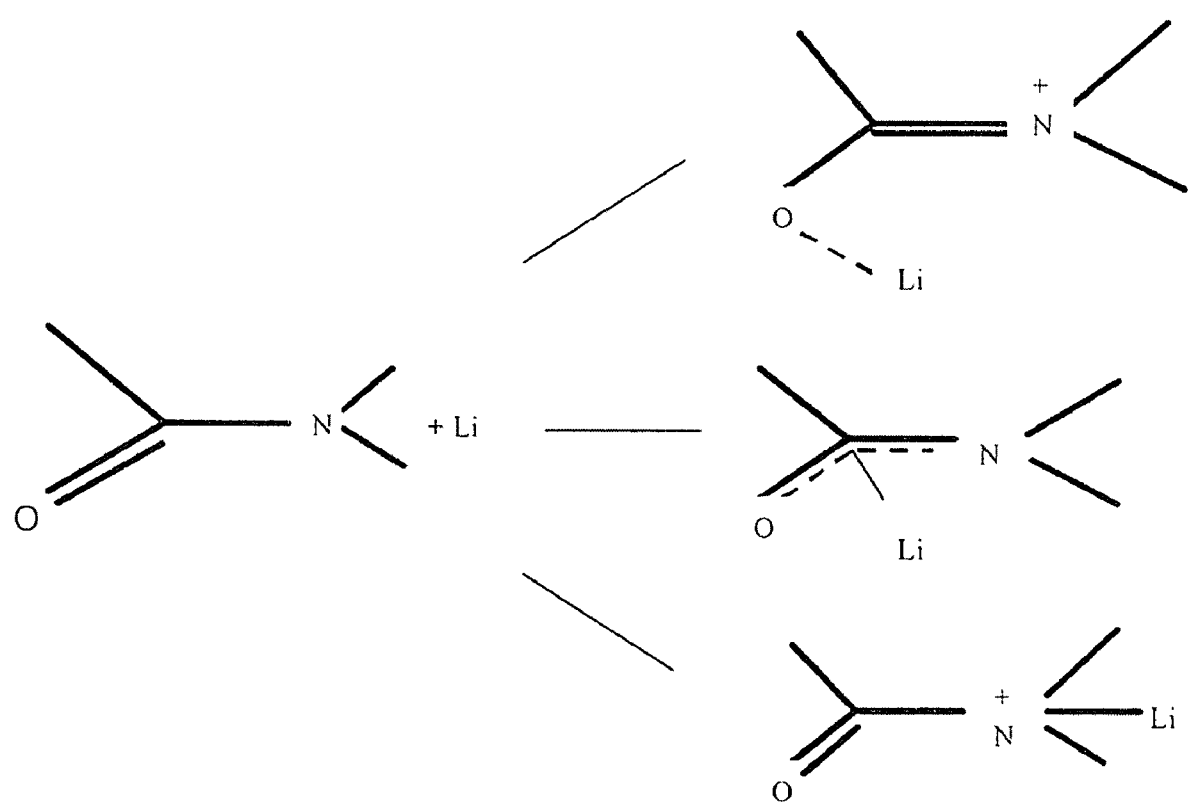
FIG. 1 shows possible modes of the bonding of lithium ions to the amide groups of nylon 6.

All patents, patent applications, government publications, government regulations, and literature references cited in this specification are hereby incorporated herein by reference in their entirety. In case of conflict, the present description, including definitions, will control.

The present invention provides a fiber-reinforced thermoplastic polymer composition or biocomposite and a process for its preparation. In particular, the present invention provides a natural fiber-reinforced thermoplastic composition wherein the thermoplastic polymer is a high melting temperature thermoplastic polymer and the fiber is from an organic source.

The present invention further provides a novel process for preparing the fiber-reinforced thermoplastic polymer composition using high melting temperature thermoplastic polymers which have melting temperatures that would ordinarily degrade the fibers at the thermoplastic polymer's melting temperature. The process comprises mixing a high melting temperature thermoplastic polymer with one or more organic or inorganic salts at the melting temperature of the thermoplastic polymer to produce a molten thermoplastic polymer mixture. The organic or inorganic salt in the molten thermoplastic polymer mixture enables the temperature to be lowered to a temperature which does not degrade fibers. After the temperature has been lowered to the temperature which does not degrade fibers, the molten thermoplastic polymer-salt mixture is mixed with one or more natural fibers to produce the natural fiber-reinforced thermoplastic composition.

The salt can be incorporated into the high melting temperature thermoplastic polymer by different methods. The polymer and the salt can be dissolved in a common solvent that is capable of dissolving both the polymer and the salt and then the polymer-salt mixture is precipitated from the solution. Another method is to dip the polymer in the salt solution and then vaporize the solvent so that the salt is coated on the polymer. Several other methods such as polymerizing the monomers in presence of the salt have also been reported. Most of the above mentioned methods are usable only on a laboratory scale. Therefore, none of the above methods are feasible or cost effective for large-scale industrial applications.

A practical method for combining the organic or inorganic salt with the thermoplastic polymer to make the present invention amenable to large-scale industrial applications uses extrusion compounding, a method commonly used by industry for blending materials. Thus, in a preferred embodiment, the present invention provides an extrusion process for producing the natural fiber-reinforced thermoplastic polymer compositions. In the process, a high melting temperature thermoplastic polymer is added to an extruder through a feeder and melted at the high melting temperature or greater temperature (first melting temperature) to melt thermoplastic polymer. Preferably, the thermoplastic polymer is added as pre-dried pellets.

The melted thermoplastic polymer is then compounded or blended with one or more organic or inorganic salts, preferably a metal salt, most preferably a metal halide salt such as lithium chloride, lithium bromide, lithium iodide, copper chloride, zinc chloride, aluminum chloride, gallium chloride, or the like. The organic or inorganic salt reduces the melting point of the thermoplastic polymer and thus, enables the processing temperature of the melted thermoplastic polymer with the salt to be lowered to a second lower melting point. Since many of the organic or inorganic salts melt at or above 500° C., a solution of these salts in a solvent such as water or an alcohol such as ethanol, is added to the extruder along with the thermoplastic polymer. Salts which have a melting temperature less than the melting temperature of the thermoplastic polymer are particularly useful. For example, aluminum chloride is a metal salt that melts at 190° C. which enables it to be blended with the thermoplastic polymer as a solid instead of first making it into a solution. The salt solution or solid in the case of aluminum chloride or other such salt is added to the extruder in the same zone as the thermoplastic polymer, that is, the first zone of the extruder. The above produces a thermoplastic polymer-salt mixture which has a melting temperature and thus, a processing temperature below 200° C., far less than the normal processing temperatures of the pristine thermoplastic polymer, which is usually greater than 230° C. Preferably, the thermoplastic polymer-salt mixture is extruded from the extruder in strands which are then chopped into pellets.

Figure 2:
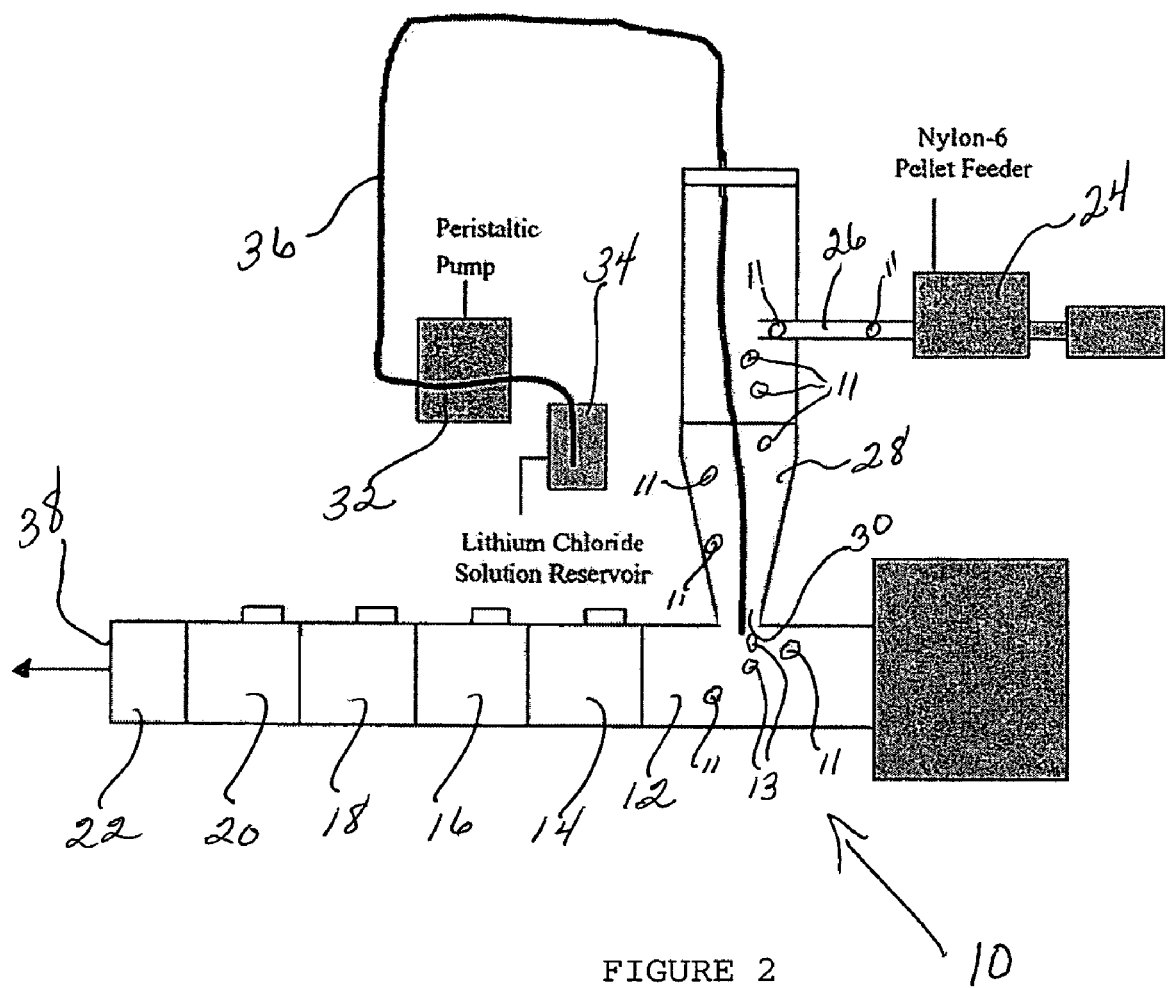
FIG. 2 shows a schematic of one embodiment of an extruder for producing a natural fiber-reinforced thermoplastic polymer composition of the present invention which uses a solution of an inorganic salt.

The decrease in melting point of the blend to a second lower melting point is proportional to the amount of inorganic salt added to the thermoplastic polymer: as the amount of salt is increased there is a corresponding decrease in the melting point of the blend. Thus, the salt content of the blend can be optimized to produce blends having a particular melting point. The decrease in melting point is due to the attacking of the amide group of the thermoplastic polymer by the metal ions. For example, while not wanting to be limited to any particular theory, FIG. 1 shows the possible modes of bonding of lithium ions to the amide group of the thermoplastic polymer nylon 6. FIG. 2 is a schematic illustration of one embodiment of an extruder for mixing a high melting temperature thermoplastic polymer and a solution containing an salt in the process of the present invention for producing a reduced melting temperature thermoplastic polymer-salt composition which is then used to produce the natural fiber-reinforced thermoplastic polymer composition.

FIG. 2 shows extruder 10 with barrels 12, 14, 16, 18, 20, and 22. Thermoplastic polymer pellets 11 are feed from pellet feeder 24 through tube 26 to feed shut 28 connected to barrel 12. The pellets 11 enter the extruder 10 through opening 30. A pump 32 transfers a salt solution in reservoir 34 to the opening 30 via tubing 36. The extruder 10 is maintained at the melting temperature of thermoplastic polymer with a heater (not shown). Therefore, as the pellets 11 and salt solution 13 are introduced into the extruder 10 through opening 30, they form a molten polymer-salt mixture which is thoroughly blended by the time the molten mixture has traveled through the extruder 10 and extruded through a die (not shown) at the distal end 38 of the extruder 10 into strands (not shown). The strands are then chopped into pellets (not shown) comprising a thermoplastic polymer-salt composition with a reduced melting temperature.

After the salt has been blended with the thermoplastic polymer to provide the thermoplastic polymer-salt mixture with the reduced melting temperature, the temperature of the mixture is lowered to the reduced melting temperature as it passes through the extruder and one or more fillers, which would degrade at the first melting temperature, are added to the thermoplastic polymer-salt mixture through a second feeder in a zone of the extruder at a distance from the first feeder to ensure that the thermoplastic polymer-salt mixture is at the second lower melting temperature when the fillers are added. Preferably, the thermoplastic polymer-salt mixture has been made into pellets as above and the pellets are added to an extruder through the feeder, melted at a reduced temperature, and the filler added to the melted mixture through a second feeder in a zone of the extruder downstream from the first feeder. The second feeder is of sufficient distance to ensure that the thermoplastic polymer-salt mixture has completely melted. The thermoplastic polymer-salt and filler mixture is then extruded at the second lower melting temperature, which is preferably about 190° C., to produce the thermoplastic polymer composition in which the natural fibers comprising the filler are not degraded. The natural fiber-reinforced compositions which is in a molten state at 190° C. can then be formed into plurality of shapes using any of the art known methods for forming thermoplastic shapes. For example, the natural fiber-reinforced compositions can be molded into shapes using molds which are set at a maximum temperature of about 190° C. instead of the more usual 230° C. or greater temperature for the pristine thermoplastic polymer. Alternatively, the natural fiber-reinforced thermoplastic polymer compositions can be formed into sheets, coupons, planchets, or the like, which at another time can be formed into shapes at the reduced melting temperature, e.g., the sheets can be formed into shapes by vacuum forming. Thus, the extruded natural fiber reinforced thermoplastic polymer compositions can be further processed into useful articles at processing temperatures which do not degrade the natural fibers comprising the composition, such temperature preferably being the temperature of the second melting point. For example, injection molding of the extruded composition then can be performed at about 190° C. instead of the more customary temperature of about 230° C. or more. Thus, the process enables natural fiber-reinforced thermoplastic polymer compositions to be produced using conventional extrusion and injection molding techniques.

The fibers from a natural source preferably used for making the compositions can be any cellulosic fiber cut to the desired length. For example, in one embodiment, the natural cellulosic fiber is quarter-inch-long (about 6.35 mm) hemp fiber. Preferably, the filler comprises one or more natural fibers from a plant, preferably a plant-based agricultural product, and can be obtained from the leaf, seed, stalk, or combinations thereof. Examples of plants which produce natural fibers which can be used include, but are not limited to, hemp, flax, kenaf, jute, sisal, pineapple leaf fiber, coir, henequen, pure cellulose in its various forms, corn, cotton, or the like. Optionally, the natural fibers can be supplemented with synthetic fibers such as high melting temperature polymer fibers or glass fibers. The natural fibers can be treated prior to use to optimize fiber-thermoplastic polymer adhesion using methods such as alkali treatments, silane treatments, or the like as are known in the art.

In one-step processing, all the components for producing the composition, the high melting temperature thermoplastic, the filler which comprises one or more natural fibers, preferably chopped, and optionally, one ore synthetic fibers, and one or more organic or inorganic salts are fed into the extruder. Then, under optimum processing conditions, the natural fiber-reinforced thermoplastic polymer composition is produced as pellets which are then further processed into useful articles by processes such as injection molding.

The high melting temperature thermoplastic polymers which can be used according to the process of the present invention include, but not limited to, polyamides such as nylon, polyethylene terephthalate (PET), polybutylene terephthalate (PBT), polytrimethylterephthalate (PTT), ethylene carbon monoxide (ECM), propylene oxide (PPO), polystyrene copolymer blends such as styrene-acrylonitrile (SAN) and styrene-maleic anhydride (SMA), polyacetals, cellulose butyrate, acrylonitrile-butadiene-styrene (ABS), methyl methacrylates, polychlorotrifluoroethylene polymers, a various mixtures of the above. Preferably, the high melting temperature thermoplastic polymer has a melting temperature greater than 180° C., more preferably, greater than 200° C. It is particularly preferable that the thermoplastic polymer is a polar, most preferably, nylon. Nylon includes, but is not limited to, those nylons selected from the group consisting of nylon 6/6, nylon 6, nylon 6/10, nylon 6/12, nylon 11, nylon 12, and nylon 6-6/6. Nylon 6 and nylon 6-6 are the most commonly used nylons in the plastics industry. The numbers refer to the number of methylene units ($-CH_2-$) occurring on each side of the nitrogen atoms (amides). Nylons are of particular interest in high temperature structural material applications because of their high heat deflection temperature.

Therefore, in a particular embodiment of the present invention, an extrusion process for producing a low melting temperature natural fiber-reinforced nylon composition from high melting point nylon is provided. In the process, nylon is compounded with one or more organic or inorganic salts to reduce the melting temperature and thus, the processing temperature of the nylon. The organic salts are metal salts of organic acids such as lactic and acetic acid. The salt used to depress the melting temperature of the nylon is preferably a metal salt which is most preferably selected from the group consisting of lithium chloride, lithium bromide, lithium iodide, copper chloride, zinc chloride, aluminum chloride, gallium chloride, and mixtures thereof. The lithium salts appear to be particularly effective in bonding the amide group of the nylon. Preferably, these salts are provided in a solution comprising water or ethanol or other solvent, and are added to the extruder along with the nylon so that both can be blended. Alternatively, for salts which have a melting temperature below the melting temperature of nylon such as ammonium chloride, the salt is added as a solid. The above nylon-salt mixture has a melting temperature below 200° C., far less than the normal 230° C. processing temperature of nylon.

After the salt has been blended with the nylon, one or more natural fibers, and optionally, synthetic fibers such as glass or polymer fibers, are added to the nylon-salt mixture in the extruder. The nylon-salt and fiber mixture is extruded at around 190° C. so that the natural fibers comprising the natural fiber-reinforced nylon composition are not degraded.

The extruded natural fiber-reinforced nylon composition can be further processed into useful articles at processing temperatures which do not degrade the natural fibers comprising the composition. For example, injection molding of the extruded natural fiber-reinforced nylon composition can be performed at about 190° C. instead of the more customary temperature of about 230° C. or more. Thus, the method enables natural fiber-reinforced nylon compositions to be produced using conventional extrusion and injection molding methods.

In one-step processing, all the components for making the composition including natural fiber, organic or inorganic salt, and chopped natural fiber are fed into the extruder and under optimum processing conditions, natural fiber-reinforced nylon compositions are produced as pellets which are then further processed into useful articles.

The process of the present invention for producing low melting temperature natural fiber-reinforced nylon compositions can be performed using industrial scale extrusion processing. Pellets of nylon, which are pre-dried, are added to the extruder through a feeder. The organic or inorganic salt used to reduce the melting point of nylon is preferably a metal salt which is most preferably selected from the group consisting of lithium chloride, lithium bromide, lithium iodide, copper chloride, zinc chloride, aluminum chloride, gallium chloride, and mixtures thereof. Preferably, the inorganic salt is a lithium salt which is provided in a solution comprising water or ethanol.

The salt solution or solid is added to the extruder in the same zone as was added the nylon, that is, the first zone. Nylon and the salt solution or solid are blended in the extruder at a temperature above the melting point of the nylon. Differential scanning calorimetry thermograms of the nylon-salt blend showed that as the weight percentage of the salt in the blend was increased, there was a corresponding decrease in the melting temperature of the blend. Thus, the salt content in the nylon-salt matrix can be is optimized to provide a matrix having a particular melting point. The nylon-salt mixture is extruded from the extruded in linear strands which are preferably chopped into pellets.

The nylon-salt mixture, which is preferably in the form of pellets, is added to an extruder using the pellet feeder and it is during the second step that a filler, preferably comprising one or more of natural fibers is added. The natural fibers used for making the compositions can be any cellulosic fiber as mentioned previously cut to the desired length. In a preferred embodiment, the natural cellulosic fiber is quarter-inch-long (about 6.35 mm) hemp fiber. The extruder temperature during the second step is maintained at the second lower melting point, preferably about 190° C., and the natural fiber is added at a later zone of the extruder such that the nylon-salt mixture has melted by the time it has reached the later zone. The extrudate following the addition of the natural fiber is a natural fiber-reinforced nylon composition. The natural fiber-reinforced nylon composition is then injection-molded into useful articles or into tensile coupons for evaluation of its mechanical properties. The injection molding temperature used for molding the natural fiber-reinforced nylon composition is at about 190° C., well below the injection molding temperatures needed for injection molding pristine nylon.

The present invention is an improvement over the prior art process. In the prior art process, thermoplastic polymer compositions such as the natural fiber-reinforced thermoplastic polymer compositions are made by lowering the temperatures of the end zones of the extruder. This has certain disadvantages. Though extrusion can be carried out using the prior art process, injection-molding the extruded material for making desired parts is problematic because the extrudate does not melt until it reaches 230° C. and at such high temperatures, most natural fibers degrade. The process of the present invention in which the melting point of the polymer is reduced avoids the prior art problem. In addition, the lower temperatures needed for operating the extruder and the injection molder provide significant energy savings.

Thus the present invention provides a novel process for producing thermoplastic polymer compositions such as the natural fiber-reinforced thermoplastic polymer compositions using high temperature melting thermoplastic polymers such as those mentioned previously and nylon in particular as a matrix and natural fibers such as cellulose as the reinforcing materials which prior to the present invention, could not be manufactured.

The process for producing natural fiber-reinforced thermoplastic polymer compositions from high temperature melting thermoplastic polymers disclosed herein can be adapted to produce a variety of natural-fiber-reinforced thermoplastic polymers with particular characteristics by adjusting particular parameters such as the amount of salt added to the thermoplastic polymer, processing conditions in the extruder and the injection molder, the type of fiber added, and the amount of fiber added. For example, other salts can be used in place of lithium chloride to depress the melting temperature of the thermoplastic and nylon in particular. Aluminum chloride has already been blended with nylon 6 and it showed positive results in reducing the processing temperature of nylon 6. The advantage of using aluminum chloride is that since it melts at 190° C., the process of making a salt solution can be eliminated and the aluminum chloride crystals directly fed to the extruder. As shown in the examples, hemp fiber is the only natural fiber that has been used to make the natural fiber-reinforced thermoplastic polymer compositions. However, the natural fiber-reinforced compositions can be made using other natural fibers such as flax, kenaf, jute, henequen, coir, sisal, pineapple leaf, cotton, corn, as well as cellulose in its various forms. A combination of two or three natural fibers can be used to get the best saturation of the binder matrix. A combination of bast fiber (Hemp/Flax/Kenaf/Jute and the like) and a leaf fiber (Sisal/Pineapple leaf fiber/Henequen) can be used for balancing the stiffness and toughness of the resulting compositions. Pure cellulose fibers can also be used in making compositions from such metal halide-based thermoplastic or nylon composites. Optimizing fiber-thermoplastic polymer adhesion in order to obtain particular desired properties can include various methods such as compatibilization of the thermoplastic polymer and fiber treatment methods such as alkali treatment and silane treatment. Maleated compatibilizer and toughening agents such as rubber/modified rubber including maleated rubber, epoxidized rubber, vegetable oil-based plasticizer, can be included in the extrusion process to get particular desired mechanical properties for particular compositions for particular structural applications in automotives, building products, and other infrastructure applications.

The present invention further provides a novel composition which is a natural fiber-reinforced thermoplastic polymer composition comprising a thermoplastic polymer and at least one organic or inorganic salt and at least one natural fiber. The salt is preferably a metal salt which is most preferably selected from the group consisting of lithium chloride, lithium bromide, lithium iodide, copper chloride, zinc chloride, aluminum chloride, gallium chloride, and mixtures thereof. The natural fiber is any cellulosic material, including but not limited to, hemp, flax, kenaf, jute, sisal, pineapple leaf fiber, coir, cotton, corn, henequen, cellulose in its various forms, or the like, and optionally, can further include synthetic fibers such as glass or high melting temperature polymer fibers. The natural fibers can be treated to optimize fiber-thermoplastic polymer adhesion using methods such as alkali treatments, silane treatments, or the like. The composition can further include a maleated compatibilizer and one or more toughening agents such as rubber/modified rubber including maleated rubber, epoxidized rubber, and vegetable oil-based plasticizer. The thermoplastic polymer includes any known thermoplastic polymer such as nylon, preferably nylon 6, or polyester such as polyethylene terepthalate and polybutylene terepthalate, or the any one or more of the polymers described previously. The composition has the novel property of having a melting temperature which is below that of the pristine thermoplastic polymer and below that which would degrade the natural fibers comprising the composition.

The following examples are intended to promote a further understanding of the present invention.

Example 1

This example shows the successful production of natural fiber-reinforced nylon 6 compositions using hemp fiber as the reinforcing material by extrusion mixing and injection molding techniques.

The initial step was to reduce the processing temperature of nylon 6 by blending it with lithium chloride in the extruder as follows.

Figure 3:
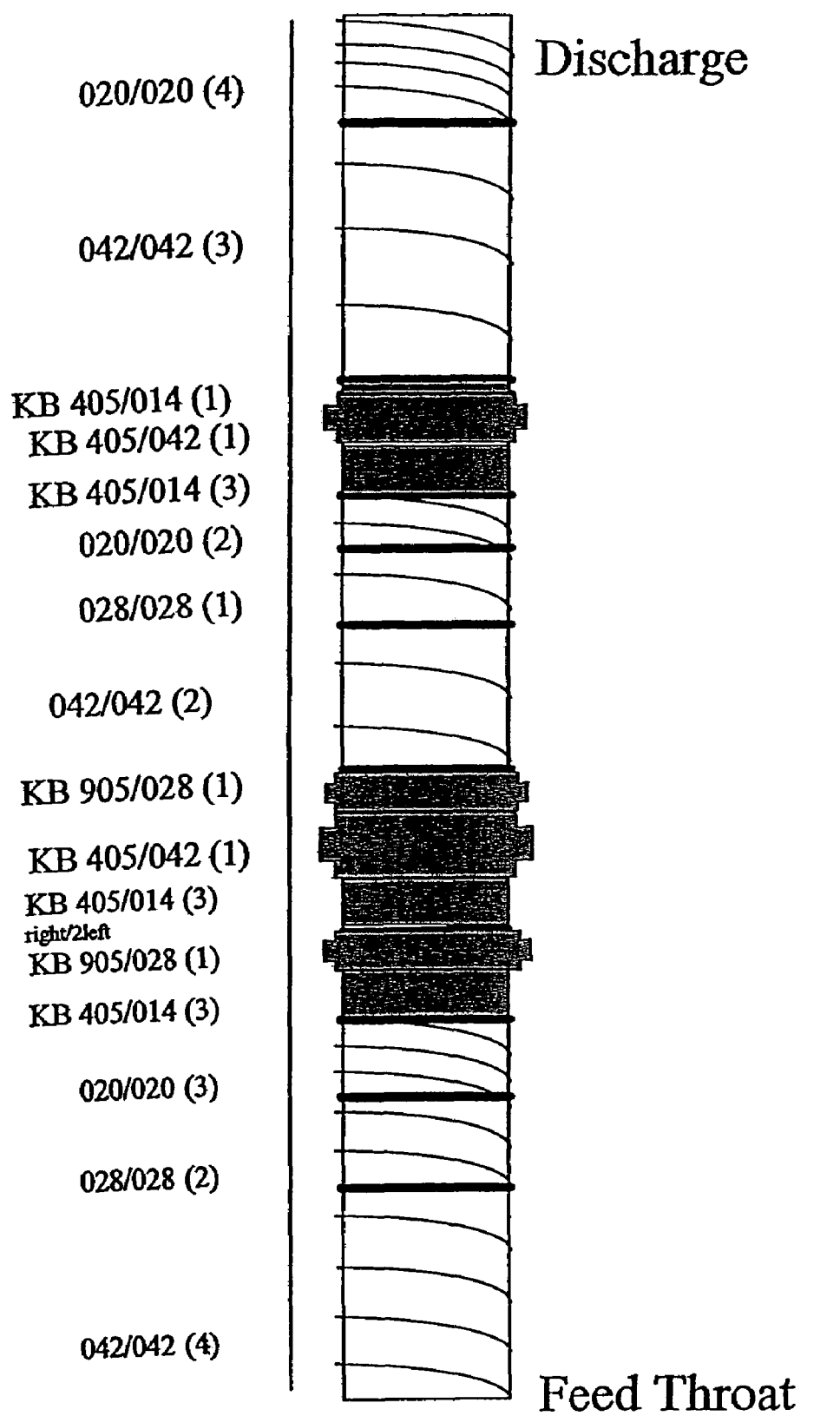
FIG. 3 shows a side view of the screw configuration of the Coperion ZSK-30 Co-Rotating Twin Screw Extruder. The numbers refer to particular screw element configurations used in the extruder of Example
Figure 4A:
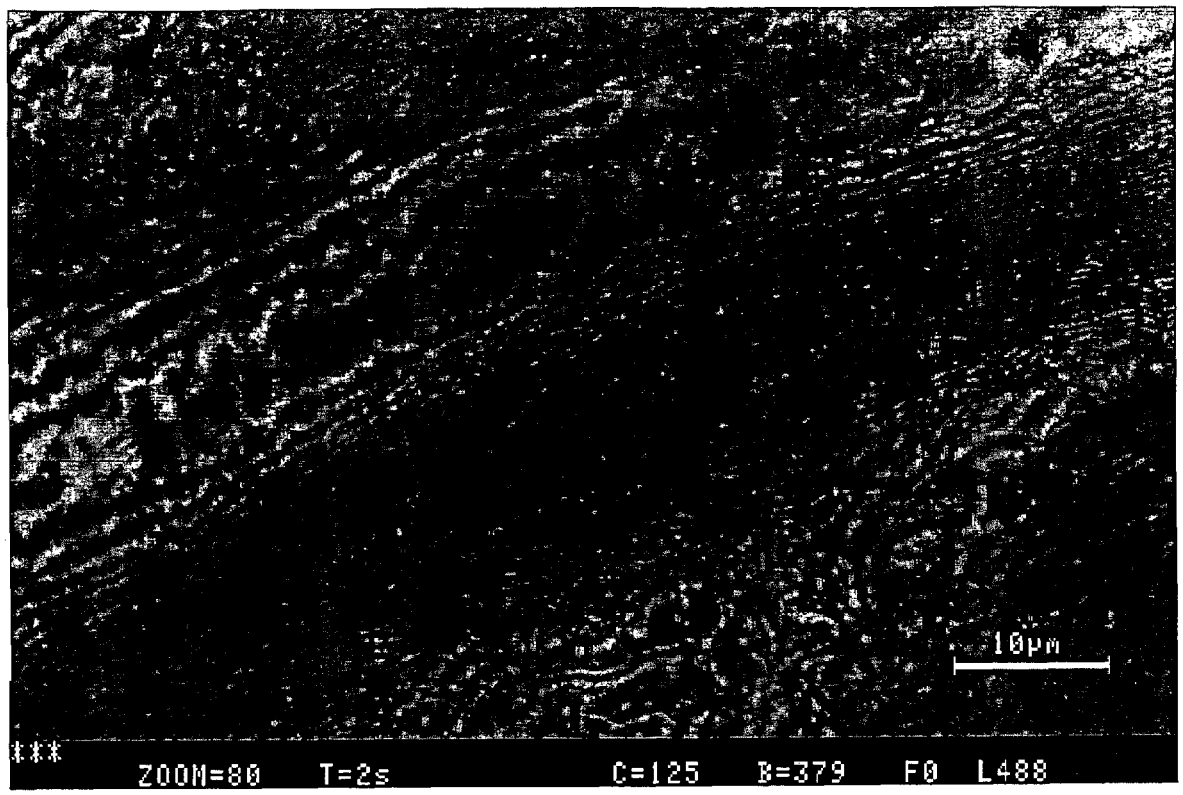
FIG. 4A is a laser scanning microscopy image of neat nylon 6 taken using Reflected light (80×).
Figure 4B:
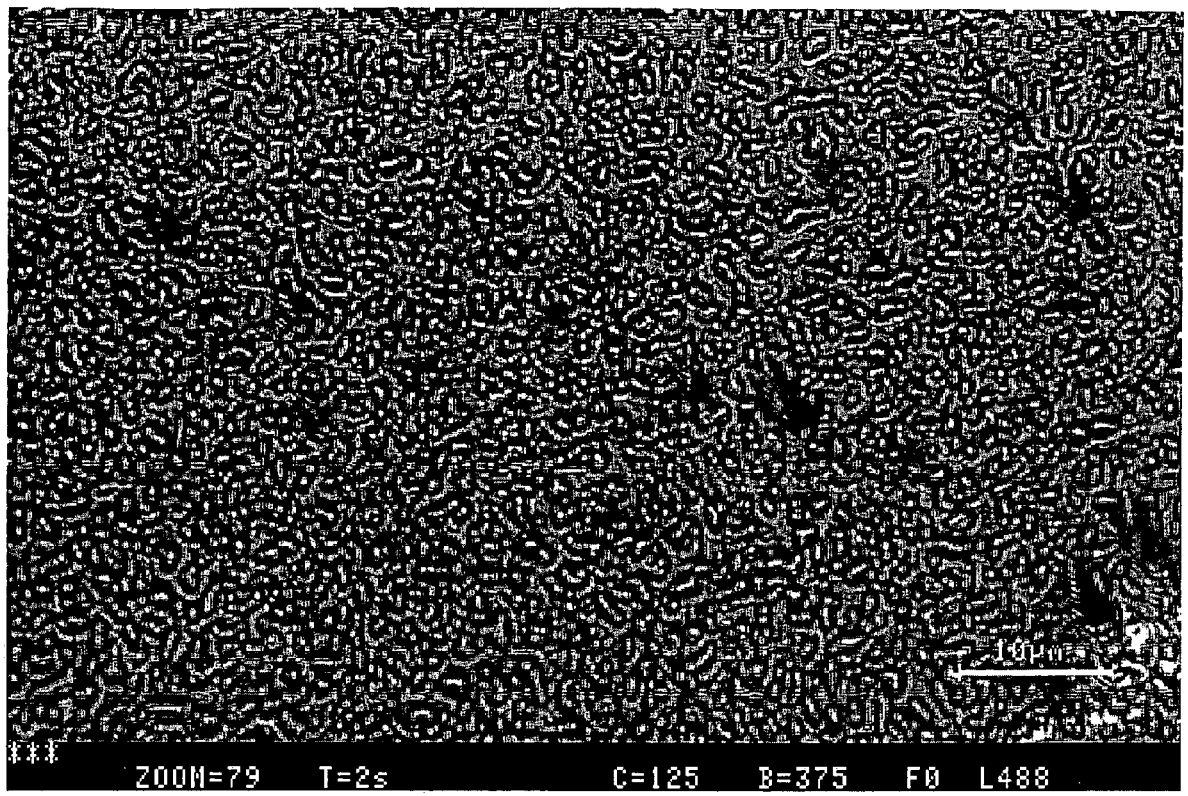
FIG. 4B is a laser scanning microscopy image of nylon 6 with 3.5 wt % LiCl taken using Reflected light (80×).
Figure 5A:
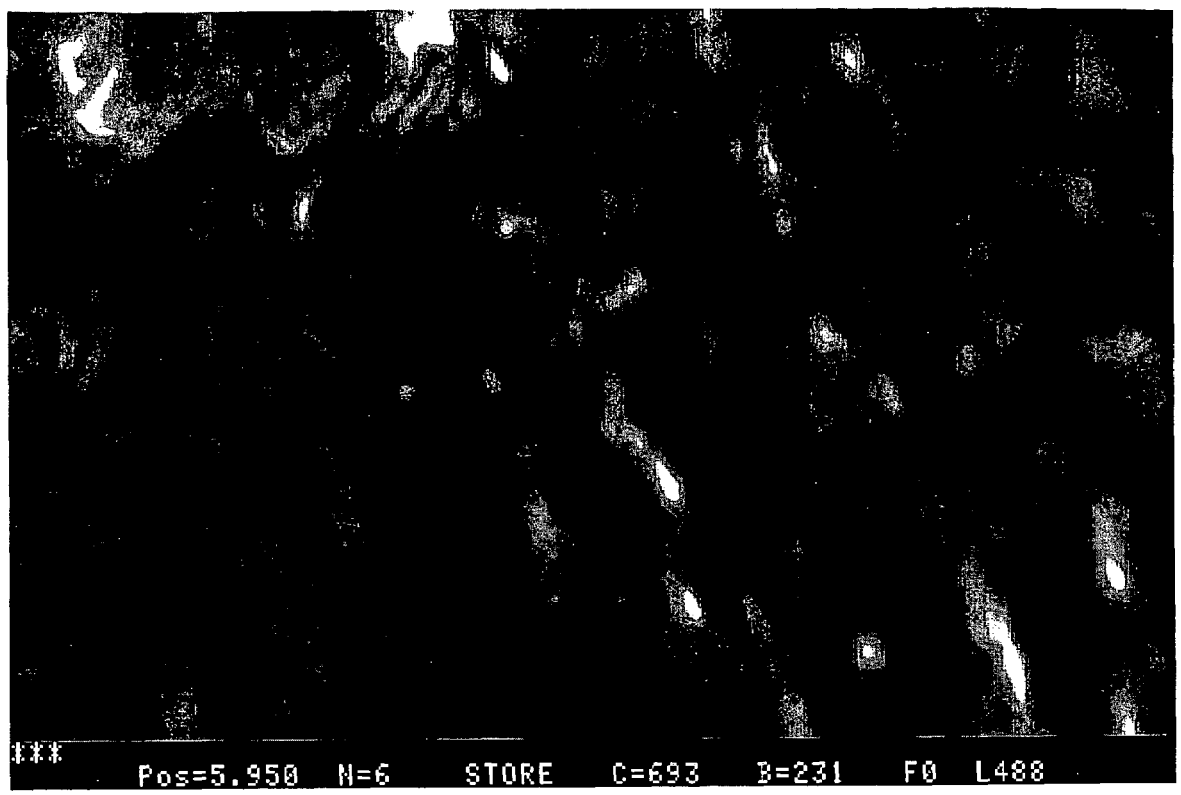
FIG. 5A is a laser scanning microscopy phase image of neat nylon 6 (160×).
Figure 5B:
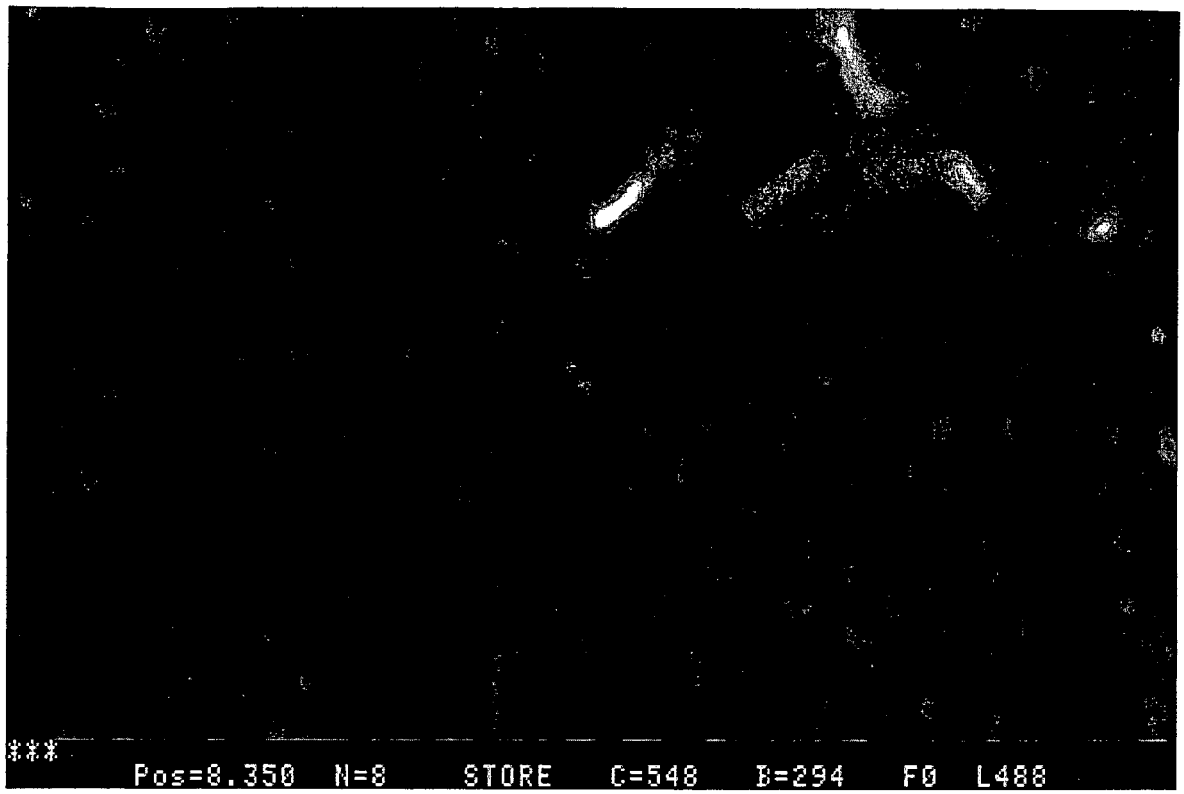
FIG. 5B is a laser scanning microscopy phase image of nylon 6 with 3.5 wt % LiCl (160×).
Figure 6A:
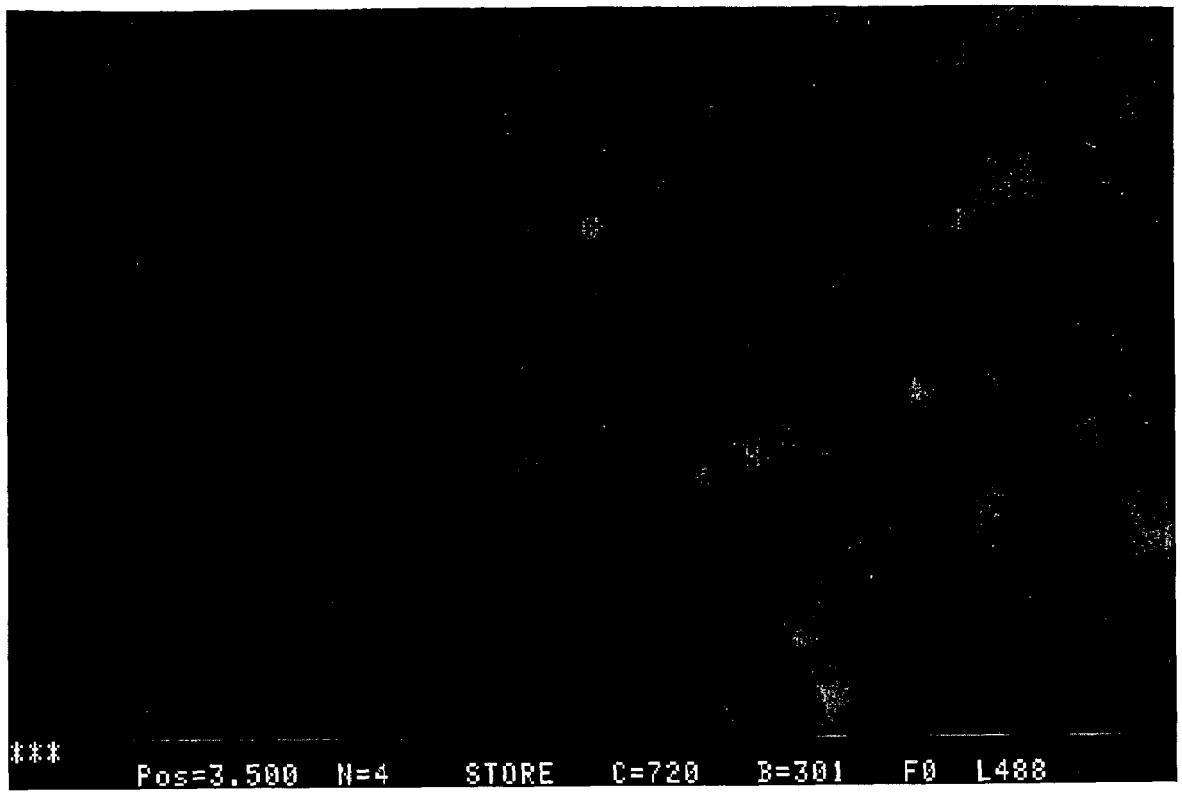
FIG. 6A is a laser scanning microscopy phase image of neat nylon 6 taken using polarized light (160×).
Figure 6B:
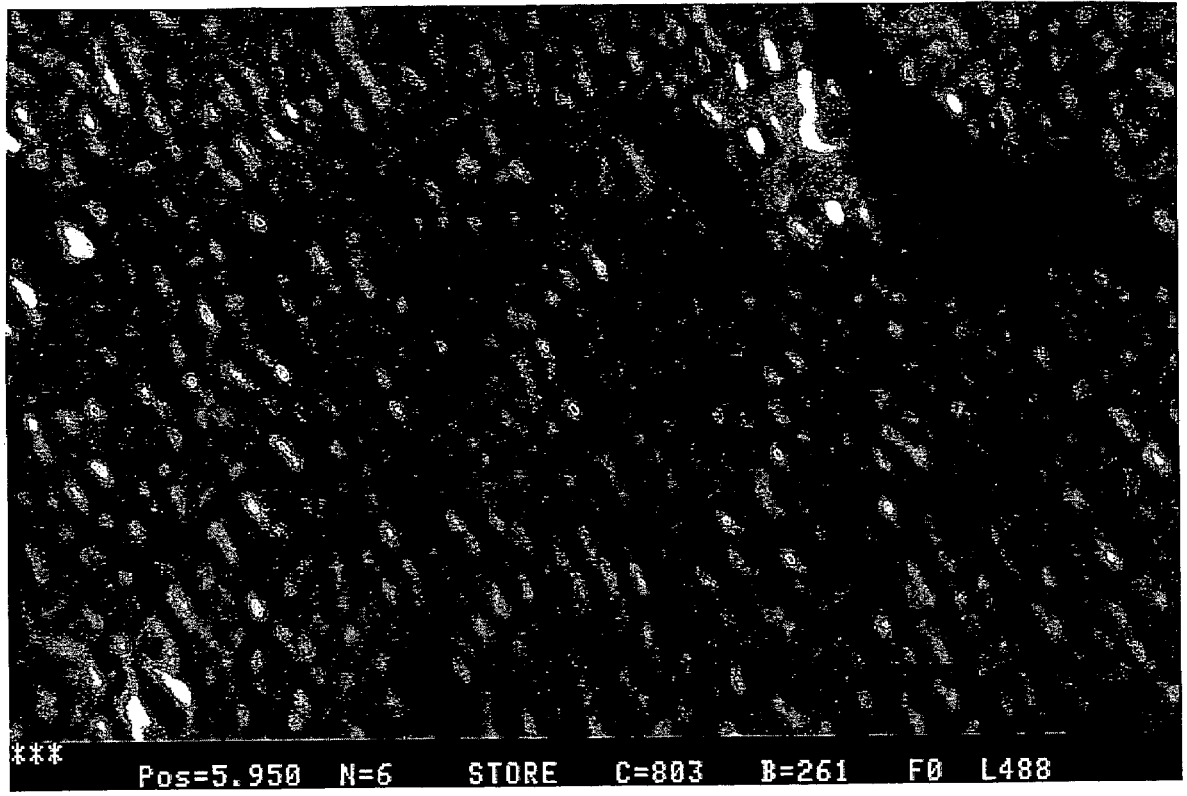

Pellets of nylon 6 were pre-dried in a vacuum oven at 80° C. overnight to get rid of the moisture absorbed by the polymer. The pre-dried pellets were fed to the extruder with a K-Tron K2V-T20 twin auger feeder. The salt solution was fed through 15 NEOPRENE MASTERFLEX tubing using a MASTERFLEX L/S model 7518-12 pump head attached to a MASTERFLEX model 752450 MASTERFLEX peristaltic pump. The salt was added to the polymer as the weight percentage of the total polymer-salt mixture and the feed rates from the pellet feeder and the peristaltic pump are adjusted accordingly. The feed rates of the pellet feeder and the salt solution were determined by weighing the output of the mechanisms over 60 second periods. The weight percentage of the salt in the final polymer-salt system ranged from 2.5 to 5. The polymer pellets and the salt solution were fed into the feed throat of a Werner & Pfleiderer ZSK 30 co-rotating twin-screw extruder. A schematic of the screw configuration of the extruder is shown in FIG. 3 and explained in Table 1. A schematic diagram showing the extrusion mixing of the polymer and the salt is shown in FIG. 2.

TABLE 1

Settings on the Extruder

| Barrel No. | Configuration | Heat Zone | Set Temp. (° C.) For Mixing Nylon 6 and LiCl | Set Temp. (° C.) For Mixing Nylon 6 – 3.5 wt % LiCl with Hemp Fiber | Set Temp. (° C.) For Mixing Nylon 6 – 3.0 wt % LiCl with Hemp Fiber |
|---|---|---|---|---|---|
| 1 | Transition/melt | — | — | — | — |
| 2 | Melt/Compression | 1 | 250 | 215 | 220 |
| 3 | Compression | 1 | 250 | 215 | 220 |
| 4 | Metering/Mixing | 2 | 255 | 205 | 210 |
| 5 | Compression | 2 | 255 | 205 | 210 |
| 6 | Metering/Mixing | 3 | 255 | 195 | 200 |
| 7 | Mixing/Metering | 3 | 255 | 195 | 200 |
| 8 | Metering/Compression | 4 | 260 | 190 | 195 |
| 9 | Compression | 4 | 260 | 190 | 195 |
| 10 | Compression | 5 | 260 | 190 | 195 |
| Die | Two-Strand Die Head | 6 | 265 | 190 | 195 |

The screw rotation speed was maintained at 100 rpm. The torque values were around 40% of full scale. The temperature profile on the extruder for this run is given in Table 2.

TABLE 2

Melting Temperatures

| Composition | Melting Temperature (° C.) |
|---|---|
| Neat Nylon 6 | 223 |
| Nylon 6 + 2.5 wt % LiCl | 208 |
| Nylon 6 + 3.0 wt % LiCl | 199 |
| Nylon 6 + 3.5 wt % LiCl | 194 |
| Nylon 6 + 5 wt % LiCl | 191 |

The melting temperature of the extruded of the nylon 6-LiCl pellets produced above with different amounts of LiCl was determined using the Differential Scanning Calorimetry technique as a function of slat content (Table 2). A TA Instruments 2920 Modulated Differential Scanning Calorimeter (DSC) was used for this purpose. A sample weight of approximately 10 milligram was used. The samples were sealed in aluminum pans. The sealed samples were placed on a heating surface in the furnace along with an empty reference aluminum pan. The samples were cooled down to −60° C. Then they were heated to 250° C. at a constant rate of 5 degrees per minute and cooled down to −60° C. at the same rate. The heat flow and energy changes in and out of the samples in the sealed aluminum pans were recorded with reference to an empty aluminum pan. Melting temperature was obtained from the peak in the heating curve. The determination of melting temperature of the polymer-LiCl helped to evaluate the processing temperatures that were needed to be used on the extruder when natural fiber was added to the system to fabricate the composite. By adding 3.5-weight percentage of lithium chloride, the melting temperature of nylon 6 was decreased to about 192° C. This weight percentage of lithium chloride was used in the nylon 6 to extrude it with natural fibers.

The die used at the extruder was a two-strand die and the diameter of the strands coming out of the die was 2 mm. The first three minutes of the extrudate was discarded and then the strands of the extrudate were collected and chopped to form pellets using a pelletizer. A Conair-Jetro division model 304 pelletizer was used to chop the strands into pellets. The pelletizer had rotating knives at the end of a 6 inch (152.4 mm) diameter rotor. The rotor had 36 teeth which means that there were 36 knives at the end of the rotor.

The nylon 6-lithium salt pellets were then used as the matrix and hemp natural fibers were incorporated into the matrix using the extrusion compounding technique. There were 10 barrels on the extruder. The top port of barrel number 7 was opened so that the hemp fiber (or mixture of hemp and glass fibers) could be added. Barrel 7 was chosen in order to make sure that the polymer had melted before the fiber is added. The auger pellet feeder was calibrated for the desired weight of the polymer matrix. The amount of hemp fiber required to obtain the desired weight composition of the fiber in the final composite for 30 seconds of the polymer fed to the extruder was weighed. The weighed hemp fiber was hand fed to the extruder at 30-second intervals. The temperature profile on the extruder for this run is given in Table 1. The composite was collected in the form of strands at the die end and chopped to form pellets.

Pristine nylon 6, nylon 6-lithium salt, and the natural fiber-reinforced nylon 6 were molded into tensile coupons using the injection molding processing technique, which is a technique widely employed in industry. The injection molder used was an 85-ton Cincinnati-Millacron press. It had a single screw and the screw rotation speed used for molding was 50 rpm. The injection, hold, and pack pressures varied on the type and composition of the material that was being molded. The injection molder had four zones, the last one being the nozzle. The zone temperatures, mold temperatures, and the timers also varied with the type and composition of the material that was being molded. The injection molding parameters for molding various compositions of materials are given in Table 3. The first five tensile coupons were discarded and the subsequent coupons are used for evaluation.

TABLE 3

Temperature (° C.) Settings on the Injection Molder

| Composition | Zone 3 | Zone 2 | Zone 1 | Nozzle | Mold |
|---|---|---|---|---|---|
| Neat Nylon 6 | 245 | 250 | 260 | 260 | 98 |
| Nylon 6 + 3.5 wt % LiCl | 215 | 215 | 215 | 215 | 27 |
| Nylon 6 + 3.5 wt % LiCl + 15 wt % Hemp Fiber | 195 | 195 | 195 | 195 | 27 |
| Nylon 6 + 3.5 wt % LiCl + 30 wt % Hemp Fiber | 195 | 195 | 195 | 195 | 27 |
| Nylon 6 + 3.5 wt % LiCl + 25 wt % Hemp Fiber + 5 wt % Glass Fiber | 195 | 195 | 195 | 195 | 27 |
| Nylon 6 + 3.0 wt % LiCl | 225 | 225 | 225 | 225 | 27 |
| Nylon 6 + 3.0 wt % LiCl + 30 wt % Hemp Fiber | 205 | 205 | 205 | 210 | 27 |
| Nylon 6 + 3.0 wt % LiCl + 40 wt % Hemp Fiber | 205 | 205 | 205 | 210 | 27 |

TABLE 3-continued

Temperature (° C.) Settings on the Injection Molder

| Composition | Zone 3 | Zone 2 | Zone 1 | Nozzle | Mold |
|---|---|---|---|---|---|
| Nylon 6 + 30 wt % Glass Fiber | 245 | 250 | 265 | 270 | 125 |

Example 2

The injection molded tensile coupons of Example 1 were tested to determine the tensile strength and tensile modulus as per the ASTM D638 standard.

The testing system used was a United Testing System SFM-20 loadframe. System control and data analysis were performed using Datum software. Load was measured using a 1000 lbf. load cell and the strain was measured using a model EXT62LOE laser extensometer with a 2 inch (50.8 mm) gage length. Crosshead speeds of 0.2 and 0.05 inches/minute (5.08 mm/minute and 1.27 mm/minute) were used for testing the plastics and the composites respectively. A preload of 2 lbs (0.907 kg) was used. Tensile strength was measured form the peak load and tensile modulus was measured from the slope of the tangent line to the initial part of the load displacement curve. The results are shown in Table 4.

Specimens were placed on a 2 inch (50.8 mm) span and loaded with a crosshead speed of 0.05 inches/minute (1.27 mm/minute). Load was measured using a 100 lbf. loadcell and the deflection was measured by a LVDT deflectometer. Flexural strength was calculated from the peak load measured and flexural modulus was calculated from the slope of the tangent line to the initial part of the load-deflection curve. The results are shown in Table 4.

Example 4

The notched izod impact strength of the injection molded tensile coupons of Example 1 was evaluated.

The injection molded tensile coupons were cut so that the samples are 2.5 inches (63.5 mm)×0.5 inches (12.7 mm)×0.125 inches (3.175 mm). 0.1 inch (2.54 mm) deep notches were cut into the sample beams using a TMI notch cutter. Notched Izod impact testing was performed on a Testing Machines Inc. 43-02-01 Monitor/Impact machine as per the ASTM D256 standard. A 5 ft-lb pendulum was used to impact the samples. The results are shown in Table 4.

Example 5

The heat deflection temperature of the injection molded tensile coupons of Example 1 was measured.

Heat Deflection Temperature was determined using a TA instruments 2980 Dynamic Mechanical Analyzer (DMA).

TABLE 4

Comparison of Mechanical Properties

| Comp. | Tensile Strength (Mpa) | Tensile Modulus (Gpa) | Flexural Strength (Mpa) | Flexural Modulus (Gpa) | Notched Izod Impact Strength (J/m) |
|---|---|---|---|---|---|
| Neat Nylon 6 | 62.7 ± 0.5 | 2.3 ± 0.1 | 84.5 ± 1.3 | 2.23 ± 0.2 | 71.9 ± 6.6 |
| Nylon 6 + 3.5 wt % LiCl | 61.7 ± 4.1 | 2.3 ± 0.1 | 98.8 ± 5.6 | 2.7 ± 0.2 | 62.9 ± 3.8 |
| Nylon 6 + 3.5 wt % LiCl + 15 wt % Hemp Fiber | 67.6 ± 1.5 | 3.5 ± 0.4 | 123.3 ± 2.7 | 4.5 ± 0.2 | 47.3 ± 16.9 |
| Nylon 6 + 3.5 wt % LiCl + 30 wt % Hemp Fiber | 71.6 ± 1.8 | 5.1 ± 0.7 | 128.4 ± 3.4 | 6.5 ± 0.6 | 34.7 ± 10.7 |
| Nylon 6 + 3.5 wt % LiCl + 25 wt % Hemp Fiber + 5 wt % Glass Fiber | 79.3 ± 1.9 | 6.7 ± 0.5 | 132.8 ± 2.9 | 7.0 ± 0.1 | 38.8 ± 11.0 |
| Nylon 6 + 3.0 wt % LiCl | 59.2 ± 3.7 | 2.5 ± 0.1 | 91.7 ± 1.2 | 2.4 ± 0.1 | — |
| Nylon 6 + 3.0 wt % LiCl + 30 wt % Hemp Fiber | 70.0 ± 1.8 | 5.4 ± 0.4 | 120.7 ± 0.7 | 5.8 ± 0.1 | — |
| Nylon 6 + 3.0 wt % LiCl + 40 wt % Hemp Fiber | 76.0 ± 5.3 | 6.7 ± 0.6 | 120.8 ± 2.3 | 7.8 ± 0.1 | 28.5 ± 6.5 |
| Nylon 6 + 30 wt % Glass Fiber | 153.8 ± 1.0 | 7.2 ± 0.7 | 247.4 ± 4.8 | 9.1 ± 0.3 | 135.0 ± 5.5 |

Example 3

The injection molded tensile coupons of Example 1 were evaluated for flexural strength and flexural modulus.

The injection molded tensile coupons were cut so that they could be accommodated in a three point bending set up. The size of the flexural testing samples used was 3.0 inches (76.2 mm)×0.5 inches (12.7 mm)×0.125 inches (3.175 mm). The testing was performed on a United Testing System SFM-20 loadframe as per the ASTM D790 standard. System control and data analysis were performed using Datum software.

Heat deflection temperature (HDT) is an important parameter when a material is being used for high temperature structural applications. Nylon 6 is particularly used as a load bearing material subjected to high temperatures in automotive underhood applications. Hence, it is important that the biodegradable composites made should retain the initial heat deflection temperature of nylon 6. HDT is a measure of the temperature at which a material deflects by 0.25 mm under the application of a load. The load used can be either 66 psi (0.046 kgf/mm$^2$) or 624 psi (0.439 kgf/mm$^2$). In the present case, a load value of 66 psi (0.046 kgf/mm$^2$) was used. The heat deflection temperature is measured as per the ASTM D 648 standard. The injection molded tensile coupons are cut so that the samples are 2.15 inches (54.61 mm)×0.5 inches (12.7 mm)×0.125 inches (3.175 mm) to accommodate the DMA. For determining the heat deflection temperature, a constant load of 66 psi (0.046 kgf/mm$^2$) is applied at the center of a 3-point bending sample and heated at the rate of 2 degrees per minute from room temperature to 200° C. or above. The sample deflection is recorded as a function of temperature. The results are shown in Table 5.

TABLE 5

Heat Deflection Temperatures of the Plastics and Composites

| Composition | Heat Deflection Temperature ° C. |
|---|---|
| Neat Nylon 6 | 153.5 |
| Nylon 6 + 3.5 wt % LiCl | 45.5 |
| Nylon 6 + 3.5 wt % LiCl + 15 wt % Hemp Fiber | 54.5 |
| Nylon 6 + 3.5 wt % LiCl + 30 wt % Hemp Fiber | 62.7 |
| Nylon 6 + 3.5 wt % LiCl + 25 wt % Hemp Fiber + 5 wt % Glass Fiber | 56.1 |
| Nylon 6 + 3.0 wt % LiCl | 43.8 |
| Nylon 6 + 3.0 wt % LiCl + 30 wt % Hemp Fiber | 70.5 |
| Nylon 6 + 3.5 wt % LiCl + 40 wt % Hemp Fiber | 169.5 |
| Nylon 6 + 30 wt % Glass Fiber | greater than 220 |

Example 6

The surface composition of the heat deflection temperature of the injection molded tensile coupons of Example 1 was measured.

The surface chemical composition of the polymer, polymer-salt system and the composite was determined using the X-Ray Photoelectron Spectroscopy (XPS) technique. The surface of the Injection Molded samples was examined to determine the percentage chemical composition on the surface. XPS surface analysis was performed using a Perkin-Elmer Physical Electronics PHI5400 ESCA Spectrometer equipped with a standard magnesium X-ray source operated at 300 W (15 kV and 20 mA). Data was collected in the Fixed Analyzer transmission mode utilizing a position sensitive detector and hemispherical analyzer. The elemental composition of the surface was determined from survey spectra collected using a pass energy of 89.45 eV. High-resolution spectra of the elements were obtained using a pass energy of 17.9 eV and a step size of 0.1 eV. Binding energies were referenced to adventitious carbon (C 1s=284.6 eV) and were measured with a precision of +0.1 eV. Chemical information indicating changes in the surface treated polymers was elucidated by curve fitting the carbon 1s (C1s) spectra. Curve fitting defined and interpreted the carbon chemistry as detected at the sample surface by allowing the user to distinguish overlapping features within the C1s spectral envelope. The C1s spectra were fit with a Lorentzian-Gaussian mix Voigt profile function using a nonlinear least squares curve-fitting program. The model used was based on the assumption that there is an approximate 1.5 eV chemical shift per bond to oxygen. The resulting curve fits had levels of experimental error around 5-10%. The data shown in Table 6 indicates that the lithium content was approximately the same as the bulk content for all samples.

TABLE 6

Surface Atomic Concentration of the Plastics and Composites as Measured by X-Ray Photoelectron Spectroscopy (XPS)

| | Concentration (%) | | | | | |
|---|---|---|---|---|---|---|
| | C | O | Si | Li | Cl | N |
| Neat Nylon 6 | 86.19 | 11.63 | 2.19 | n.d. | n.d. | |
| Nylon 6 + 3.5 wt % LiCl | 82.17 | 10.46 | 0.77 | 4.77 | 0.48 | 1.34 |
| Nylon 6 + 3.5 wt % LiCl + 30 wt % Hemp Fiber | 78.29 | 12.59 | 1.53 | 4.28 | 0.63 | 2.69 |
| Nylon 6 + 3.0 wt % LiCl | 74.98 | 13.62 | 0.98 | 4.74 | 0.16 | 5.53 |
| Nylon 6 + 3.0 wt % LiCl + 40 wt % Hemp Fiber | 75.22 | 13.12 | 0.40 | 3.24 | 0.14 | 7.88 |

Example 7

The morphology of the injection molded samples of Example 1 was determined.

The addition of salt to the polymer affects the crystallization properties of the polymer. This change can be noticed by looking at the morphology of the polymer-salt and comparing it to the morphology of the polymer. The injection molded samples were microtomed onto a glass slide to give a sample of thickness 20 µm. The area to be microtomed was chosen far from the surface of the Injection Molded coupon, deep into it. Confocal Laser Scanning Microscopy was used to examine the surface morphology of the microtomed sample. A Zeiss LSM 210 was employed for this purpose. A laser light of wavelength 488 nm was used to scan the surfaces of the microtomed samples. The advantage of using the confocal laser scanning microscopy is that the sample can be sectioned in steps along the thickness using the laser light and each section can be imaged. Approximately 12 sections were imaged, the section thickness being 1000 nm. In all cases the lithium modified nylon-6 possessed a different morphology than its unmodified precursor. The results are shown in FIGS. 4A and 4B, 5A and 5B, and 6A and 6B.

COMPARATIVE EXAMPLE 1

The mechanical properties of the natural fiber-reinforced nylon 6 compositions prepared according to Example 1 were compared to the nylon 6-cellulose composition data in U.S. Pat. No. 6,270,883 to Sears et al. The comparisons are shown in Tables 7 and 8.

TABLE 7

Comparison of the Flexural Properties of Hemp-Reinforced Nylon 6 Compositions to the Compositions of U.S. Pat. No. 6,270,883

| Composition | Flexural Strength (Mpa) | Std. Dev. | Flexural Modulus (Gpa) | Std. Dev. |
|---|---|---|---|---|
| Neat Nylon 6 | 84.5 | 1.3 | 2.23 | 0.21 |
| Nylon 6 + 3 wt % LiCl | 91.7 | 1.2 | 2.44 | 0.09 |
| Nylon 6 + 3 Wt % LiCl + 30 wt % Hemp Fiber | 120.7 | 0.7 | 5.82 | 0.07 |
| Nylon 6 + 3 Wt % LiCl + 30 wt % Hemp Fiber | 120.8 | 2.3 | 7.82 | 0.10 |

TABLE 7-continued

Comparison of the Flexural Properties of Hemp-Reinforced Nylon 6 Compositions to the Compositions of U.S. Pat. No. 6,270,883

| Composition | Flexural Strength (Mpa) | Std. Dev. | Flexural Modulus (Gpa) | Std. Dev. |
|---|---|---|---|---|
| Nylon 6 + 30 wt % Terracel dry & conditioned ('883 patent) | 84.2 & 88.1 | — | 4.58 & 4.73 | — |
| Nylon 6 + 33 wt % glass (Sears et al. publications) | 146.7 | — | 7.55 | — |

TABLE 8

Comparison of the Tensile Properties of Hemp-Reinforced Nylon 6 Compositions to the Compositions of U.S. Pat. No. 6,270,883

| Composition | Tensile Strength (Mpa) | Std. Dev. | Tensile Modulus (Gpa) | Std. Dev. |
|---|---|---|---|---|
| Neat Nylon 6 | 62.7 | 0.5 | 2.26 | 0.11 |
| Nylon 6 + 3 wt % LiCl | 59.2 | 0.2 | 2.46 | 0.11 |
| Nylon 6 + 3 Wt % LiCl + 30% wt % Hemp Fiber | 70.0 | 1.8 | 5.43 | 0.40 |
| Nylon 6 + 3 Wt % LiCl + 30% wt % Hemp Fiber | 76.0 | 5.3 | 6.73 | 0.56 |
| Nylon 6 + 30 wt % Rayonier Cellulose ('883 patent) | 79.0 & 80.0 | — | 5.63 & 5.74 | — |
| Nylon 6 + 33 wt % glass (Sears et al. publications) | 111.2 | — | 8.02 | — |

The data in Tables 7 and 8 clearly shows that stiffness and strength of the hemp-reinforced nylon 6 compositions of the present invention was superior to the nylon 6-Terracel composition of the '883 patent. The hemp-reinforced nylon 6 compositions not only had superior mechanical properties to the nylon 6-Terracel composition but they are also cost effective. Hemp fiber costs about 30 cents a pound whereas Terracel costs about 80 cents a pound.

The concentration of the LiCl on the surface of the injection molded coupons of the hemp-reinforced nylon 6 compositions was determined by X-Ray Photoelectron Spectroscopy. The percentage atomic concentration of the LiCl on the surface was found to be in direct proportion to its bulk composition which indicated that there was no surface migration or enhancement of the LiCl.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A process for producing an article from a temperature sensitive natural fibers-reinforced thermoplastic polymer composition which comprises:
   (a) extrusion melt-forming through a die in a first extruder a first mixture to form first strands, the first mixture consisting essentially of a high melting temperature thermoplastic polymer with a first melting temperature of 200° C. or above, which has been pre-dried to remove moisture, and at least one metal salt selected from the group consisting of lithium chloride, lithium bromide, lithium iodide, copper chloride, zinc chloride, aluminum chloride, gallium chloride, and mixtures thereof, wherein (i) the salt reduces the melting point of the first mixture to a second lower melting temperature of less than 200° C., (ii) the metal salt is added to the melted thermoplastic polymer in the first extruder as a water solution comprising the metal salt, and (iii) the metal in the metal salt forms a reaction product with the thermoplastic polymer in the melt;
   (b) pelletizing the first strands to form pellets;
   (c) extruding a second mixture of one or more temperature sensitive natural fibers and the pellets in a second extruder, at the second lower melting temperature of less than 200° C. without degrading the natural fibers to form second strands of the temperature sensitive natural fibers-reinforced thermoplastic polymer composition, wherein the temperature sensitive natural fibers consist essentially of cut fibers selected from the group consisting of a plant leaf, seed, stalk and combinations thereof; and
   (d) melt-forming an article from the composition of step (c), wherein the extruding and melt forming without the metal salt degrades the temperature sensitive natural fibers.

2. The process of claim 1 wherein the fibers are selected from the group consisting of hemp, flax, kenaf, jute, sisal, pineapple leaf fiber, coir, henequen, corn, cotton, and mixtures thereof.

3. The process of claim 1 wherein the fibers-reinforced composition further includes a maleated compatibilizer and one or mare toughening agents selected from the group consisting of rubber, modified rubber, maleated rubber, epoxidized rubber, vegetable oil-based plasticizer, and mixtures thereof.

4. The process of claim 1, 2, or 3 wherein the thermoplastic polymer is selected from the group consisting of nylon, polyethylene terephthalate (PET), polybutylene terephthalate (PBT), polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

5. The process of claim 1 wherein the fibers-reinforced thermoplastic polymer composition is molded into a shape.

6. The process of claim 1 wherein a glass or a high melting temperature polymer fiber is introduced with the fibers in step (c).

7. A process for producing a temperature sensitive natural filler-reinforced thermoplastic nylon polymer composition as an article which comprises:
   (a) extrusion melt-forming through a die in a first extruder a first mixture to form first strands, the first mixture consisting essentially of a high melting temperature thermoplastic nylon polymer with a first melting temperature of 200° C. or above and which has been pre-dried to remove moisture and a metal chloride, bromide or iodide salt, wherein (i) the salt is present in an amount between about 2.6 and 5 percent by weight of the polymer, (ii) the salt reduces the melting temperature of the first mixture to a second lower melting temperature of less than 200° C., (iii) the metal chloride, bromide or iodide salt is added to the melted thermoplastic nylon polymer in the first extruder as a water solution comprising the metal chloride, bromide or iodide salt, and (iv)

the metal in the metal chloride, bromide or iodide salt forms a reaction product with the thermoplastic nylon polymer in the melt;
(b) pelletizing the first strands to form pellets; and
(c) extruding a second mixture of a temperature sensitive natural filler and the pellets in a second extruder, at the second lower melting temperature of less than 200° C. without degrading the temperature sensitive natural filler to form second strands of the natural filler-reinforced thermoplastic nylon polymer composition, wherein the temperature sensitive natural filler consists essentially of cut fibers selected from the group consisting of a plant leaf, seed, stalk and combinations thereof and, without the metal salt, the extrusion with the temperature sensitive natural filler degrades the temperature sensitive natural filler.

8. The process of claim 7 wherein the fibers are selected from the group consisting of hemp, flax, kenaf, jute, sisal, pineapple leaf fiber, coir, henequen, corn, cotton, and mixtures thereof.

9. The process of claim 7 or 8 wherein the salt is selected from the group consisting of lithium chloride, lithium bromide, lithium iodide, copper chloride, zinc chloride, aluminum chloride, gallium chloride, and mixtures thereof.

10. The process of claim 7 wherein in addition the filler reinforced thermoplastic polymer composition is molded into a shape.

11. The process of claim 7 wherein a glass or a high melting temperature polymer fiber is introduced with the natural filler in step (c).

12. A process for producing a temperature sensitive natural filler-reinforced thermoplastic polymer composition as an article which comprises:
(a) extrusion melt-forming through a die in a first extruder a first mixture to form first strands, the first mixture consisting essentially of a thermoplastic polymer and at least one metal chloride, bromide or iodide salt, wherein (i) the thermoplastic polymer has been pre-dried to remove moisture and has a melting temperature at about 200° C. or above, (ii) the salt is present in an amount between about 2.5 and 5 percent by weight of the polymer, (iii) the salt reduces the melting temperature of the first mixture to less than about 200° C., (iv) the metal chloride, bromide or iodide salt is added to the melted thermoplastic polymer in the first extruder as a water solution comprising the metal chloride, bromide or iodide salt, and (v) the metal in the metal chloride, bromide or iodide salt forms a reaction product with the thermoplastic polymer in the melt;
(b) pelletizing the first strands to form pellets; and
(c) extruding a second mixture of the temperature sensitive natural filler and the pellets in a second extruder, at less than 200° C. without degrading the temperature sensitive natural filler to form second strands of the natural filler-reinforced thermoplastic polymer composition, wherein the temperature sensitive natural filler consists essentially of cut fibers selected from the group consisting of a plant leaf, seed, stalk and combinations thereof and, without the metal salt, the extrusion with the temperature sensitive natural filler degrades the temperature sensitive natural filler.

13. The process of claim 12 wherein the thermoplastic polymer is selected from the group consisting of nylon, polyethylene terephthalate (PET), polybutylene terephthalate (PBT), polytrimethylterephthalate (PTT), ethylene carbon monoxide (ECM), propylene oxide (PPO), polystyrene copolymer blends, polyacetals, cellulose butyrate, acrylonitrile-butadiene-styrene (ABS), methyl methacrylates, polychlorotrifluoroethylene polymers, and mixtures thereof.

14. The process of claim 12 wherein the filler is selected from the group consisting of hemp, flax, kenaf, jute, sisal, pineapple leaf fiber, coir, henequen, corn, cotton, and mixtures thereof.

15. The process of claim 12 wherein the metal salt is selected from the group consisting of lithium chloride, lithium bromide, lithium iodide, copper chloride, zinc chloride, aluminum chloride, gallium chloride, and mixtures thereof.

16. The process of claim 12 wherein a glass or a high melting temperature polymer fiber is introduced with the temperature sensitive natural filler in step (c).

17. A process for producing a temperature sensitive natural filler-reinforced thermoplastic nylon polymer composition, the process comprising:
(a) melting in a first extruder a thermoplastic nylon polymer with a first melting temperature of 200° C. or above and which has been pre-dried to remove moisture;
(b) adding a metal salt solution to the melted thermoplastic nylon polymer in the first extruder, the metal salt solution consisting essentially of water and a metal halide salt, thereby forming a first mixture comprising the melted thermoplastic nylon polymer and the metal halide salt in the first extruder, wherein (i) the first mixture has a second lower melting temperature of less than 200° C. and (ii) the metal in the metal halide salt forms a reaction product with the mailed thermoplastic nylon polymer;
(c) extrusion melt-forming through a die in the first extruder the first mixture to form first strands;
(d) pelletizing the first strands to form pellets; and
(e) extruding a second mixture of a temperature sensitive natural filler and the pellets in a second extruder at the second lower melting temperature of less than 200° C. without degrading the temperature sensitive natural filler to form second strands of the natural filler-reinforced thermoplastic nylon polymer composition, wherein (i) the temperature sensitive natural filler consists essentially of cut fibers selected from the group consisting of a plant leaf, seed, stalk and combinations thereof, and (ii) without the metal salt, the extrusion with the temperature sensitive natural filler degrades the temperature sensitive natural filler.

18. The process of claim 17 wherein the metal halide salt is selected from the group consisting of lithium chloride, lithium bromide, lithium iodide, copper chloride, zinc chloride, aluminum chloride, gallium chloride, and mixtures thereof.

19. The process of claim 18 wherein the metal halide salt is present in the first mixture in an amount between about 2.5 and 5 percent by weight of the thermoplastic nylon polymer.

20. The process of claim 17, 18, or 19 wherein the cut fibers are selected from the group consisting of hemp, flax, kenaf, jute, sisal, pineapple leaf fiber, coir, henequen, corn, cotton, and mixtures thereof.

21. The process of claim 17, 18, or 19 wherein a glass or a high melting temperature polymer fiber is introduced with the fibers in step (e).

* * * * *

UNITED STATES PATENT AND TRADEMARK OFFICE
CERTIFICATE OF CORRECTION

PATENT NO. : 7,582,241 B2  Page 1 of 1
APPLICATION NO. : 10/701879
DATED : September 1, 2009
INVENTOR(S) : Mohanty et al.

It is certified that error appears in the above-identified patent and that said Letters Patent is hereby corrected as shown below:

Column 6, line 35, "of Example" should be --of Example 1.--.

Column 20, line 61, Claim 7, "about 2.6 and" should be --about 2.5 and--.

Column 22, line 32, Claim 17, "mailed" should be --melted--.

Signed and Sealed this

Second Day of February, 2010

David J. Kappos
*Director of the United States Patent and Trademark Office*